United States Patent
Kushiyama et al.

(10) Patent No.: US 8,954,247 B2
(45) Date of Patent: Feb. 10, 2015

(54) POWER TRANSMISSION APPARATUS AND METHOD FOR CONTROLLING POWER TRANSMISSION APPARATUS

(71) Applicant: Honda Motor Co., Ltd., Tokyo (JP)

(72) Inventors: Hiroyuki Kushiyama, Wako (JP); Ukyo Ogata, Wako (JP); Kenichi Namerikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 13/663,471

(22) Filed: Oct. 30, 2012

(65) Prior Publication Data

US 2013/0138310 A1 May 30, 2013

(30) Foreign Application Priority Data

Nov. 29, 2011 (JP) ................................. 2011-260932

(51) Int. Cl.
*F16H 61/06* (2006.01)
(52) U.S. Cl.
USPC .......................................................... 701/60
(58) Field of Classification Search
None
See application file for complete search history.

(56) References Cited

U.S. PATENT DOCUMENTS

| 8,271,178 B2 * | 9/2012 | Matsubara et al. | ............. | 701/79 |
| 2007/0005211 A1 * | 1/2007 | Katsumata et al. | ............. | 701/67 |
| 2010/0057316 A1 * | 3/2010 | Tanaka et al. | ................... | 701/61 |
| 2012/0116637 A1 * | 5/2012 | Totsuka | ......................... | 701/60 |

FOREIGN PATENT DOCUMENTS

| JP | 06-76824 B2 | 6/1986 |
| JP | 2003-254419 | 9/2003 |
| WO | WO 2011/010547 | 1/2011 |

OTHER PUBLICATIONS

Japanese Office Action for corresponding JP Application No. 2011-260932, Sep. 19, 2013.

* cited by examiner

*Primary Examiner* — John R Olszewski
*Assistant Examiner* — James M McPherson
(74) *Attorney, Agent, or Firm* — Mori & Ward, LLP

(57) ABSTRACT

A power transmission apparatus includes a continuously variable transmission, a clutch, a drive condition determination device, an input torque calculator, a belt transfer torque calculator, and a clutch transfer torque controller. The continuously variable transmission includes a drive pulley, a driven pulley, and a belt. The clutch transfer torque controller controls a transfer torque of the clutch so that the transfer torque of the clutch is higher than or equal to an input torque calculated by the input torque calculator and is lower than a transfer torque of the belt calculated by the belt transfer torque calculator if it is determined that the vehicle is under a drive condition.

7 Claims, 7 Drawing Sheets

POWER TRANSMISSION APPARATUS AND METHOD FOR CONTROLLING POWER TRANSMISSION APPARATUS

CROSS-REFERENCE TO RELATED APPLICATIONS

The present application claims priority under 35 U.S.C. §119 to Japanese Patent Application No. 2011-260932, filed Nov. 29, 2011, entitled "Power Transmission Apparatus." The contents of this application are incorporated herein by reference in their entirety.

BACKGROUND OF THE INVENTION

1. Field of the Invention

The present application relates to a power transmission apparatus and a method for controlling the power transmission apparatus.

2. Discussion of the Background

If a vehicle is suddenly decelerated due to, for example, sudden braking (panic braking), the rotational speed of a drive axle is sharply reduced. In addition, a force of inertia that arises from the drive axle (i.e., from the road surface) increases sharply. If the transmission mounted in the vehicle is a continuously variable transmission, the force of inertia acts on the continuously variable transmission as an excess load.

Accordingly, Japanese Examined Patent Application Publication No. 6-76824 describes a technology that intentionally allows a belt to slip by decreasing an adjustment line pressure supplied to a hydraulic actuator of the continuously variable transmission to lower than a reference value when a sudden deceleration is detected.

Alternatively, a technology that allows a clutch to function as a torque limiter has been widely used. In such a technology, a hydraulic wet clutch is disposed in series to the continuously variable transmission, between the drive source and a drive axle. Even when an unforeseen load is imposed on the continuously variable transmission, slippage of the belt can be prevented by allowing the clutch to slip.

SUMMARY OF THE INVENTION

According to one aspect of the present invention, a power transmission apparatus includes a continuously variable transmission, a clutch, a drive condition determination device, an input torque calculator, a belt transfer torque calculator, and a clutch transfer torque controller. The continuously variable transmission includes a drive pulley, a driven pulley, and a belt. The drive pulley is connected to a drive source mounted in a vehicle. The driven pulley is connected to a drive wheel of the vehicle. The belt is entrained between the drive pulley and the driven pulley. The clutch is disposed in series to the continuously variable transmission between the drive source and the drive wheel. The drive condition determination device is configured to determine whether the vehicle is under a drive condition in which an output torque of the drive source is decreasing. The input torque calculator is configured to calculate an input torque. The input torque includes the output torque of the drive source and an inertia torque input to the drive pulley. The belt transfer torque calculator is configured to calculate a transfer torque of the belt based on at least the input torque calculated by the input torque calculator, and a predetermined friction coefficient. The clutch transfer torque controller is configured to calculate a transfer torque of the clutch based on the input torque calculated by the input torque calculator, the clutch transfer torque controller controlling the transfer torque of the clutch so that the transfer torque of the clutch is higher than or equal to the input torque calculated by the input torque calculator and is lower than the transfer torque of the belt calculated by the belt transfer torque calculator if it is determined that the vehicle is under the drive condition.

According to another aspect of the present invention, in a method for controlling a power transmission apparatus, it is determining whether a vehicle is under a drive condition in which an output torque of a drive source is decreasing. An input torque is calculated. The input torque includes an output torque of the drive source and an inertia torque input to a drive pulley of a continuously variable transmission. A transfer torque of a belt of the continuously variable transmission is calculated based on at least the input torque calculated in the calculating of the input torque and a predetermined friction coefficient. A transfer torque of a clutch is controlled so that the transfer torque of the clutch is higher than or equal to the input torque calculated in the calculating of the input torque and is lower than the transfer torque of the belt calculated in the calculating of the transfer torque of the belt if it is determined that the vehicle is under the drive condition. The clutch is disposed in series to the continuously variable transmission.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
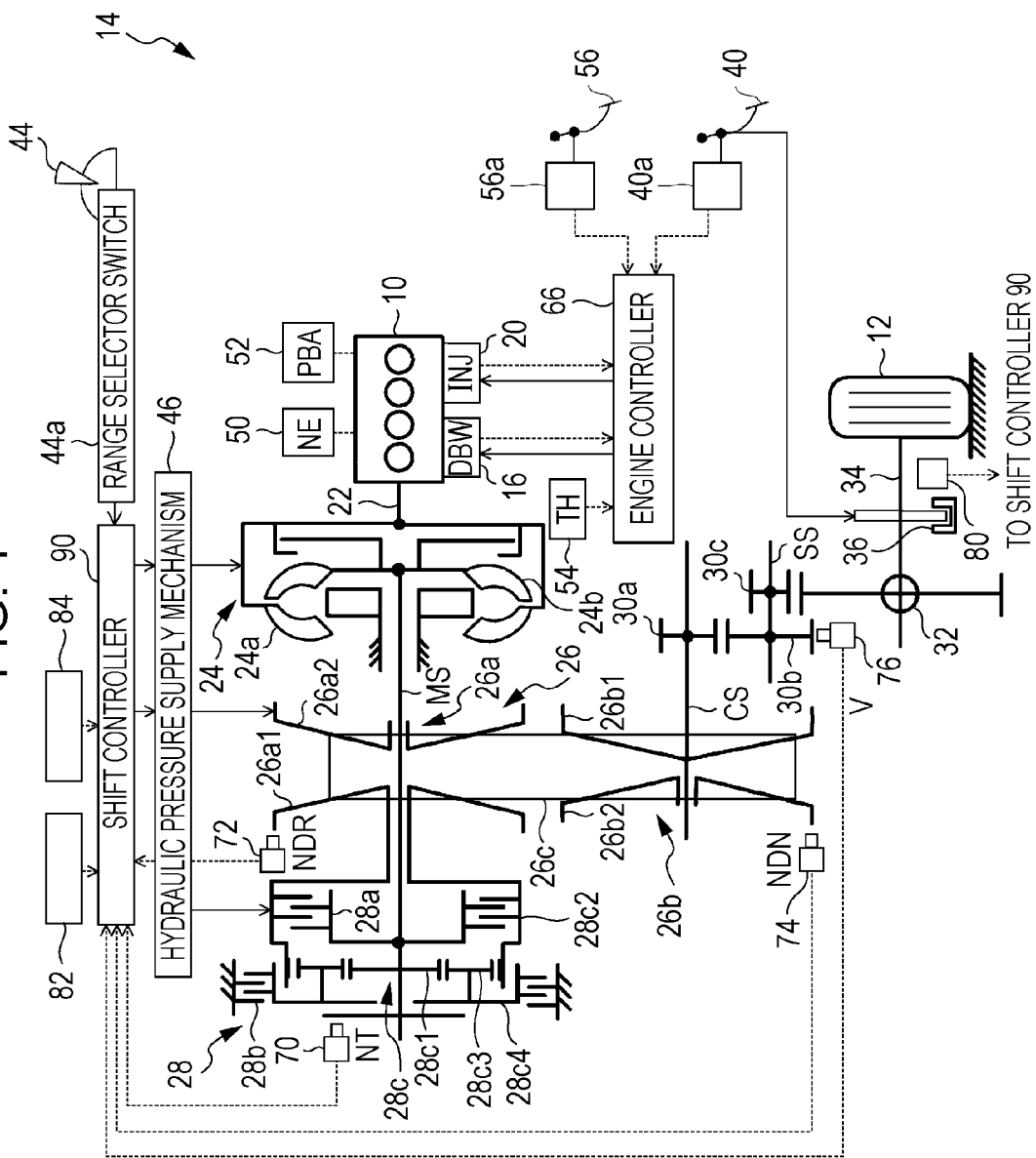
FIG. 1 is a schematic illustration of a power transmission apparatus according to an exemplary embodiment of the present application.

The embodiments will now be described with reference to the accompanying drawings, wherein like reference numerals designate corresponding or identical elements throughout the various drawings.

Figure 2:
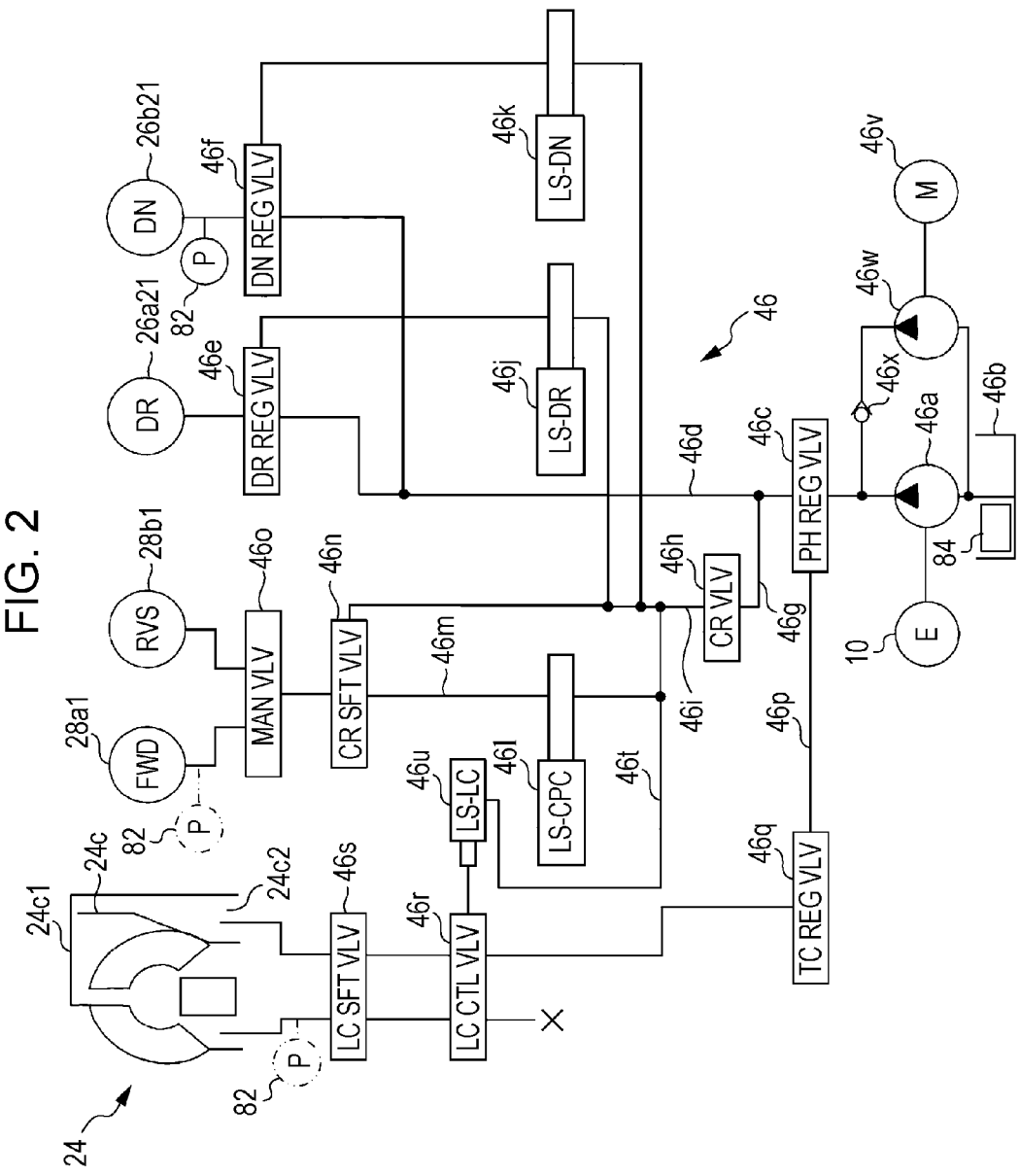
FIG. 2 is a hydraulic circuit diagram of a hydraulic pressure supply mechanism illustrated in FIG. 1.

FIG. 1 is a schematic illustration of a power transmission apparatus according to an exemplary embodiment of the present application. FIG. 2 is a hydraulic circuit diagram of a hydraulic pressure supply mechanism illustrated in FIG. 1.

An engine 10 (an internal-combustion engine, i.e., a drive source) is illustrated in FIG. 1. The engine 10 is mounted in a vehicle 14 having drive wheels 12 (note that the vehicle 14 is partially illustrated by, for example, the drive wheels 12).

A throttle valve (not illustrated) is mounted in an air intake system of the engine 10. The throttle valve is not mechanically connected to an accelerator pedal mounted on the floor of the cockpit of the vehicle. The accelerator pedal is connected to a drive-by-wire (DBW) mechanism 16 including an actuator, such as an electric motor. The throttle valve is opened and closed by the DBW mechanism 16.

The intake air in an amount controlled by the throttle valve flows through an intake manifold (not illustrated) and is mixed with fuel injected from an injector 20 in the vicinity of an intake port of each of cylinders of the engine. Thus, an air-fuel mixture is generated. When an intake valve (not illustrated) opens, the air-fuel mixture flows into a combustion chamber (not illustrated) of the cylinder. The air-fuel mixture is ignited in the combustion chamber, and combustion of the air-fuel mixture pushes the piston down, which turns a crankshaft 22. Thereafter, the air-fuel mixture is discharged into the outside of the engine 10 in the form of exhaust gas.

The rotation of the crankshaft 22 is input to a continuously variable transmission (CVT) 26 via a torque converter 24.

That is, the crankshaft 22 is connected to a pump impeller 24a of the torque converter 24. A turbine runner 24b is disposed so as to face the pump impeller 24a and receive fluid (hydraulic oil). The turbine runner 24b is connected to a main shaft (an input shaft) MS.

The CVT 26 includes the main shaft MS (more precisely, a drive pulley 26a disposed on the main shaft MS on the outer periphery side), a counter shaft (an output shaft) CS disposed parallel to the main shaft MS (more precisely, a driven pulley 26b disposed on the counter shaft CS on the outer periphery side), and a power transfer element formed from an endless-loop flexible member (e.g., a metal belt 26c) that runs between the main shaft MS and the counter shaft CS.

The drive pulley 26a includes a fixed pulley half 26a1 disposed so as to be relatively unrotatable about the main shaft MS on the outer periphery side and be unmovable in the axis direction of the main shaft MS and a movable pulley half 26a2 disposed so as to be relatively rotatable about the main shaft MS on the outer periphery side and be movable relative to the fixed pulley half 26a1 in the axis direction.

The driven pulley 26b includes a fixed pulley half 26b1 disposed so as to be relatively unrotatable about the counter shaft CS on the outer periphery side and be unmovable in the axis direction of the counter shaft CS and a movable pulley half 26b2 disposed so as to be relatively rotatable about the counter shaft CS on the outer periphery side and be movable relative to the fixed pulley half 26b1 in the axis direction.

The CVT 26 is connected to the engine 10 via a forward/reverse drive switching mechanism 28. The forward/reverse drive switching mechanism 28 includes a forward clutch 28a that allows the vehicle 14 to drive in the direction of forward movement and a reverse braking clutch 28b that allows the vehicle 14 to drive in the reverse direction, and a planetary gear train 28c disposed between the forward clutch 28a and the reverse braking clutch 28b. The CVT 26 is connected to the engine 10 via the forward clutch 28a.

The forward clutch 28a and the reverse braking clutch 28b (more precisely, mainly the forward clutch 28a) function as a clutch of the above-described torque limiter. Hereinafter, the forward clutch 28a is simply referred to as a "clutch".

In the planetary gear train 28c, a sun gear 28c1 is fixed to the main shaft MS. A ring gear 28c2 is fixed to the fixed pulley half 26a1 of the drive pulley 26a via the forward clutch 28a.

A pinion 28c3 is disposed between the sun gear 28c1 and the ring gear 28c2. The pinion 28c3 is connected to the sun gear 28c1 using a carrier 28c4. When the reverse braking clutch 28b is activated, the carrier 28c4 is secured (locked).

Rotation of the counter shaft CS is transferred from a secondary shaft (an intermediate shaft) SS to the drive wheels 12. That is, the rotation of the counter shaft CS is transferred to the secondary shaft SS via gears 30a and 30b. Thereafter, the rotation is transferred from a differential 32 to a drive shaft (drive axle) 34 via a gear 30c. Subsequently, the rotation is transferred from the drive shaft 34 to the right and left drive wheels 12 (note that only the right drive wheel 12 is illustrated).

A disc brake 36 is disposed in the vicinity of each of four wheels including the drive wheels (front wheels) 12 and driven wheels (rear wheels) (not illustrated). A brake pedal 40 is disposed on the floor of the cockpit of the vehicle.

Switching between the forward clutch 28a and the reverse braking clutch 28b in the forward/reverse drive switching mechanism 28 is carried out by a driver who operates a range selector 44 provided in the cockpit of the vehicle. For example, the driver selects one of the ranges P, R, N, and D. The range information selected through the operation performed on the range selector 44 by the driver is transmitted to a manual valve of a hydraulic pressure supply mechanism 46 (described in more detail below).

For example, if any one of "D", "S", and "L" ranges is selected through the operation performed on the range selector 44 by the driver, the spool of the manual valve moves by a distance in accordance with the selected range. Thus, hydraulic oil (a hydraulic pressure) is forced from a piston chamber of the reverse braking clutch 28b, while a hydraulic pressure is supplied to a piston chamber of the forward clutch 28a. Thus, the clutch 28a is engaged.

If the forward clutch 28a is engaged, all of the gears rotate together with the main shaft MS. The drive pulley 26a is driven in a direction that is the same as that of the main shaft MS (i.e., the direction of forward movement). Accordingly, the vehicle 14 moves in the direction of forward movement.

However, if the "R" range is selected, the hydraulic oil is forced from the piston chamber of the forward clutch 28a while a hydraulic pressure is supplied to the piston chamber of the reverse braking clutch 28b. Thus, the reverse braking clutch 28b is activated. Accordingly, the carrier 28c4 is fixed and, therefore, the ring gear 28c2 is driven in a direction that is opposite to the direction of the movement of the sun gear 28c1. The drive pulley 26a is driven in a direction that is opposite to the direction of the movement of the main shaft MS (i.e., the reverse direction). Accordingly, the vehicle 14 moves in the reverse direction.

If one of the "P" and "N" ranges is selected, the hydraulic oil is forced from the two piston chambers and, therefore, the forward clutch 28a and the reverse braking clutch 28b are released. Accordingly, power transfer via the forward/reverse drive switching mechanism 28 is stopped and, therefore, power transfer from the engine 10 to the drive pulley 26a of the CVT 26 is stopped.

FIG. 2 illustrates a hydraulic circuit diagram of the hydraulic pressure supply mechanism 46.

As illustrated in FIG. 2, the hydraulic pressure supply mechanism 46 includes a hydraulic pump 46a. The hydraulic pump 46a is formed as a gear pump. The hydraulic pump 46a is driven by the engine (E) 10. The hydraulic pump 46a pumps the hydraulic oil pooled in a reservoir 46b and pressure-feeds the hydraulic oil to a PH regulator valve (PH REG VLV) 46c.

The output of the PH regulator valve 46c (a PH pressure (a line pressure)) in one of two directions is connected from an oil passage 46d to a piston chamber (DR) 26a21 of the movable pulley half 26a2 of the drive pulley 26a of the CVT 26 and a piston chamber (DN) 26b21 of the movable pulley half 26b2 of the driven pulley 26b of the CVT 26 via a first regulator valve (DR REG VLV) 46e and a second regulator valve (DN REG VLV) 46f, respectively. The output of the PH regulator valve 46c in the other direction is connected to a CR valve (CR VLV) 46h via an oil passage 46g.

The CR valve 46h reduces the PH pressure and generates a CR pressure (a control pressure). The CR pressure is supplied from an oil passage 46i to a first linear solenoid valve (LS-DR) 46j, a second linear solenoid valve (LS-DN) 46k, and a third linear solenoid valve (LS-CPC) 46l.

The first linear solenoid valve 46j and the second linear solenoid valve 46k generate output pressures in accordance with excitation of the solenoids thereof and apply the output pressures to the first regulator valve 46e and the second regulator valve 46f, respectively. Thus, the hydraulic oil of the PH pressure fed from the oil passage 46d is supplied to the piston chambers 26a21 and 26b21 of the movable pulley halves 26a2 and 26b2, respectively. In this way, pulley side pressures are generated in accordance with the PH pressure.

Accordingly, a pulley side pressure that moves the movable pulley halves 26a2 and 26b2 is generated and, therefore, the pulley widths of the drive pulley 26a and the driven pulley 26b vary. That is, the radius of the belt loop of the belt 26c varies. By adjusting the pulley side pressure in this manner, the ratio of the power transferred to the drive wheels 12 to the output of the engine 10 (i.e., the transmission gear ratio) can be continuously varied.

In addition, the output of the CR valve 46h (the CR pressure) is connected to a CR shift valve (CR SFT VLV 46n via an oil passage 46m. Thereafter, the output is connected to a piston chamber (FWD) 28a1 of the clutch 28a and a piston chamber (RVS) 28b1 of the reverse braking clutch 28b of the forward/reverse drive switching mechanism 28 via the above-described manual valve (MAN VLV) (denoted by the reference numeral "46o").

As described above, the manual valve 46o connects the output of the CR shift valve 46n to one of the piston chamber 28a1 of the forward clutch 28a and the piston chamber 28b1 of the reverse braking clutch 28b in accordance with the position of the range selector 44 operated (selected) by the driver.

Furthermore, the output of the PH regulator valve 46c is transferred to a TC regulator valve (TC REG VLV) 46q via an oil passage 46p. The output of the TC regulator valve 46q is connected to an LC shift valve (LC SFT VLV) 46s via an LC control valve (LC CTL VLV) 46r.

The output of the LC shift valve 46s in one of two directions is connected a piston chamber 24c1 of a lockup clutch 24c of the torque converter 24, while the output of the LC shift valve 46s in the other direction is connected to the box 24c2 located on the back side of the piston chamber 24c1.

If the hydraulic oil is supplied to the piston chamber 24c1 via the LC shift valve 46s and, at the same time, is exhausted from the box 24c2 located on the back side, the lockup clutch 24c is engaged (turned on). However, if the hydraulic oil is supplied to the box 24c2 on the back side and, at the same time, is exhausted from the piston chamber 24c1, the lockup clutch 24c is released (turned off). The amount of slippage of the lockup clutch 24c is determined by the amounts of the hydraulic oil supplied to the piston chamber 24c1 and the box 24c2 on the back side.

The output of the CR valve 46h is connected to the LC control valve 46r and the LC shift valve 46s via an oil passage 46t. The oil passage 46t has a fourth linear solenoid valve (LS-LC) 46u inserted thereinto. The amount of slippage of the lockup clutch 24c is regulated (controlled) by excitation/non-excitation of the solenoid of the fourth linear solenoid valve 46u.

Furthermore, an electric oil pump (EOP) 46w connected to an electric motor 46v is connected to a position downstream of the hydraulic pump 46a and upstream of the PH regulator valve 46c via a check valve 46x.

Like the hydraulic pump 46a, the EOP 46w is formed as a gear pump. The EOP 46w is driven by the electric motor 46v. The EOP 46w pumps the hydraulic oil pooled in the reservoir 46b and pressure-feeds the hydraulic oil to the PH regulator valve (PH REG VLV) 46c.

According to the present exemplary embodiment, the power transmission apparatus (denoted by the reference numeral "48") includes the torque converter 24, the CVT 26, and the forward/reverse drive switching mechanism 28.

Referring back to FIG. 1, a crank angle sensor 50 is disposed at an appropriate position in the vicinity of a camshaft (not illustrated) of the engine 10. The crank angle sensor 50 outputs a signal indicating an engine speed NE at every predetermined crank angle of the piston. In the air intake system, an absolute pressure sensor 52 is disposed at an appropriate position downstream of the throttle valve. The absolute pressure sensor 52 outputs a signal that is proportional to the absolute pressure PBA in an intake pipe (an engine load).

The actuator of the DBW mechanism 16 has a throttle position sensor 54. The throttle position sensor 54 outputs a signal that is proportional to a position TH of the throttle valve using the rotational amount of the actuator.

In addition, an accelerator position sensor 56a is disposed in the vicinity of the above-described accelerator pedal (denoted by the reference numeral "56"). The accelerator position sensor 56a outputs a signal that is proportional to an accelerator position AP corresponding to the amount of operation performed on the accelerator pedal 56 by the driver. Furthermore, a brake switch 40a is disposed in the vicinity of the brake pedal 40. The brake switch 40a outputs an ON signal in response to the operation performed on the brake pedal 40 by the driver.

Still furthermore, a water temperature sensor (not illustrated) is disposed in the vicinity of a cooling water passage (not illustrated) of the engine 10. The water temperature sensor outputs a value corresponding to an engine cooling water temperature TW, i.e., the temperature of the engine 10.

The above-described outputs, such as the output of the crank angle sensor 50, are transmitted to an engine controller 66. The engine controller 66 is formed from a microcomputer including a central processing unit (CPU), a read only memory (ROM), a random access memory (RAM), and input/output (I/O) units. The engine controller 66 determines a target throttle position on the basis of the outputs of the sensors and controls the operation performed by the DBW mechanism 16. In addition, the engine controller 66 determines the amount of injected fuel and drives the injector 20.

An NT sensor (a rotational speed sensor) 70 is disposed on the main shaft MS. The NT sensor 70 outputs a pulse signal indicating the rotational speed of the turbine runner 24b and, more precisely, a rotational speed NT of the main shaft MS and, more particularly, the rotational speed of the input shaft of the transmission (and the input shaft of the forward clutch 28a).

An NDR sensor (a rotational speed sensor) 72 is disposed at an appropriate position in the vicinity of the drive pulley 26a of the CVT 26. The NDR sensor 72 outputs a pulse signal in proportion to a rotational speed NDR of the drive pulley 26a, that is, the rotational speed of the output shaft of the forward clutch 28a.

An NDN sensor (a rotational speed sensor) 74 is disposed at an appropriate position in the vicinity of the driven pulley 26b. The NDN sensor 74 outputs a pulse signal in proportion to a rotational speed NDN of the driven pulley 26b and, more precisely, the rotational speed of the counter shaft CS and, more particularly, the rotational speed of the output shaft of the transmission.

In addition, a V sensor (a rotational speed sensor) 76 is disposed in the vicinity of the gear 30b of the secondary shaft SS. The V sensor 76 outputs a pulse signal indicating the rotational speed of the secondary shaft SS and the rotational direction (more particularly, a pulse signal indicating a vehicle velocity V). A wheel speed sensor 80 is disposed in the vicinity of each of the four wheels including the drive wheels 12 and driven wheels (not illustrated). The wheel speed sensor 80 outputs a pulse signal that is proportional to the wheel speed indicating the rotational speed of the wheel.

Referring back to FIG. 1, a range selector switch 44a is disposed in the vicinity of the range selector 44. The range selector switch 44a outputs a signal indicating one of, for example, the ranges "R", "N", and "D" selected by the driver.

As illustrated in FIG. 2, in the hydraulic pressure supply mechanism 46, an oil pressure sensor 82 is disposed in the oil passage that communicates with the driven pulley 26b of the CVT 26. The oil pressure sensor 82 outputs a signal that is proportional to the hydraulic pressure supplied to the piston chamber 26b21 of the movable pulley half 26b2 of the driven pulley 26b. An oil temperature sensor 84 is disposed in the reservoir 46b. The oil temperature sensor 84 outputs a signal that is proportional to the oil temperature (a temperature TATF of hydraulic oil ATF).

The outputs of the above-described sensors (e.g., the NT sensor 70) and the outputs of the other sensors (not illustrated) are transmitted to a shift controller 90. Like the engine controller 66, the shift controller 90 is formed from a microcomputer including a CPU, a ROM, a RAM, I/O units. The shift controller 90 can communicate with the engine controller 66.

The shift controller 90 starts excitation of electromagnetic solenoids (e.g., the fourth linear solenoid valve 46u of the hydraulic pressure supply mechanism 46) or stop the excitation using the above-described detection values. Thus, the shift controller 90 controls the operations performed by the forward/reverse drive switching mechanism 28, the CVT 26, and the torque converter 24. In addition, the shift controller 90 applies an electric current to the electric motor 46v of the hydraulic pressure supply mechanism 46 so as to control the operation performed by the EOP 46w.

Figure 3:
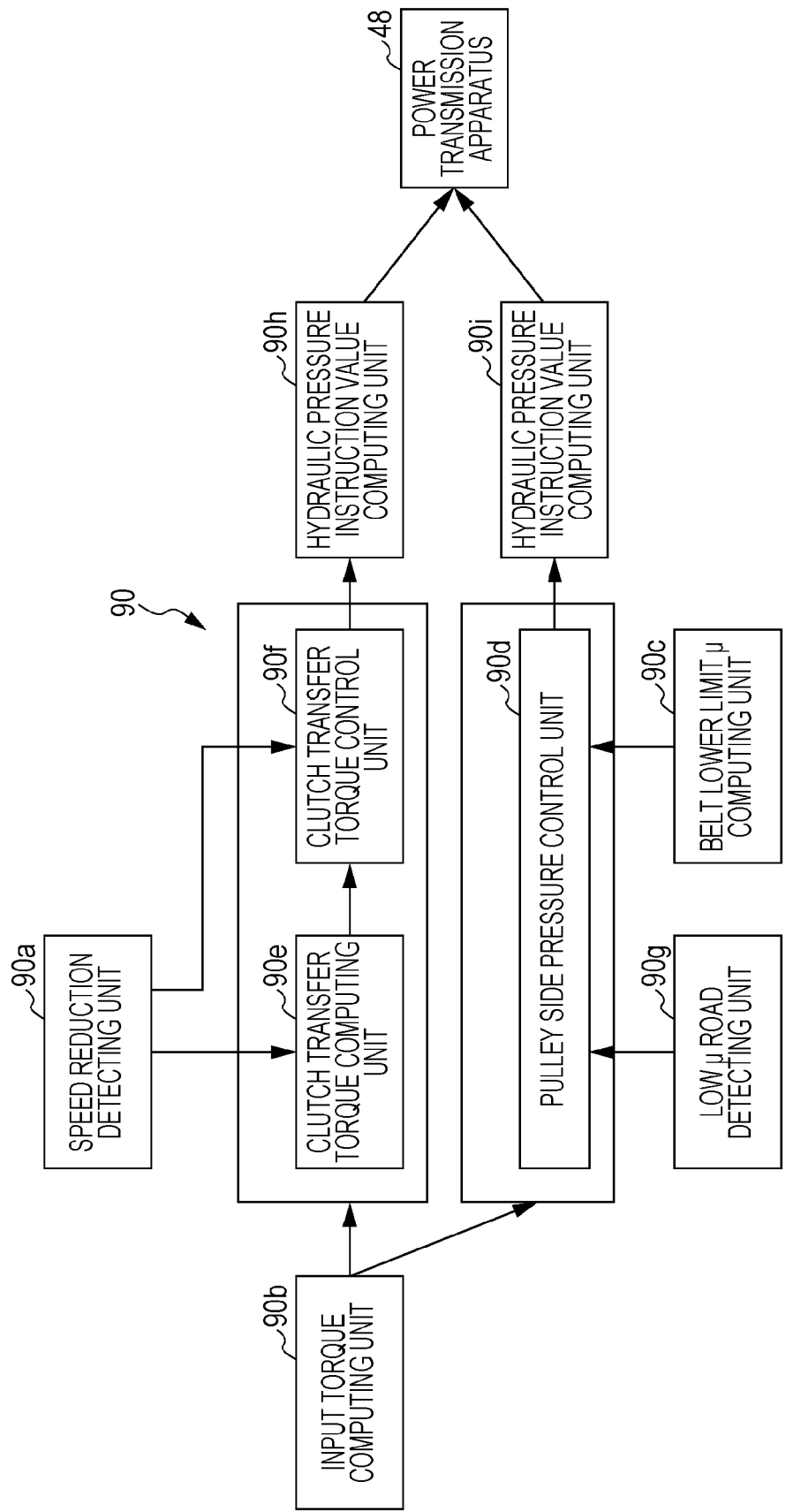
FIG. 3 is a functional block diagram illustrating the operation performed by a shift controller illustrated in FIG. 1.

FIG. 3 is a functional block diagram illustrating the slippage prevention operation of the belt 26c of the CVT 26 described first among the above-described operations performed by the shift controller 90.

As illustrated in FIG. 3, the shift controller 90 includes a speed reduction detecting unit (a drive condition determination unit) 90a, an input torque computing unit 90b, a belt lower limit $\mu$ computing unit 90c, a pulley side pressure control unit (a belt transfer torque computing unit) 90d, a clutch transfer torque computing unit 90e, and a clutch transfer torque control unit 90f. The speed reduction detecting unit 90a determines whether the vehicle is under a drive condition in which the vehicle 14 is decelerating, that is, the output torque of the engine 10 is being reduced. The input torque computing unit 90b computes the input represented by the sum of the output torque of the engine 10 input from the engine 10 to the drive pulley 26a of the CVT 26 via the main shaft MS and the inertia torque. The belt lower limit $\mu$ computing unit 90c obtains the belt lower limit $\mu$, that is, a predetermined friction coefficient $\mu$ of the belt 26c. The pulley side pressure control unit 90d computes the pulley side pressure, that is, the transfer torque of the belt 26c on the basis of at least the computed input torque and the lower limit $\mu$. The clutch transfer torque computing unit 90e computes the transfer torque of the clutch (the forward clutch) 28a on the basis of the computed input torque. The clutch transfer torque control unit 90f controls the transfer torque of the clutch 28a on the basis of the output of the clutch transfer torque computing unit 90e.

The shift controller 90 further includes a low $\mu$ road detecting unit 90g that detects whether the road on which the vehicle 14 is moving is a low $\mu$ road, that is, a road having a low friction coefficient $\mu$. The output of the low $\mu$ road detecting unit 90g is transmitted to the pulley side pressure control unit 90d.

The output of the clutch transfer torque control unit 90f and the output of the pulley side pressure control unit 90d are transmitted to hydraulic pressure instruction value computing units 90h and 90i, respectively. The hydraulic pressure instruction value computing units 90h and 90i compute instruction values. The operation of the power transmission apparatus 48 is controlled on the basis of the computed instruction values.

Figure 4:
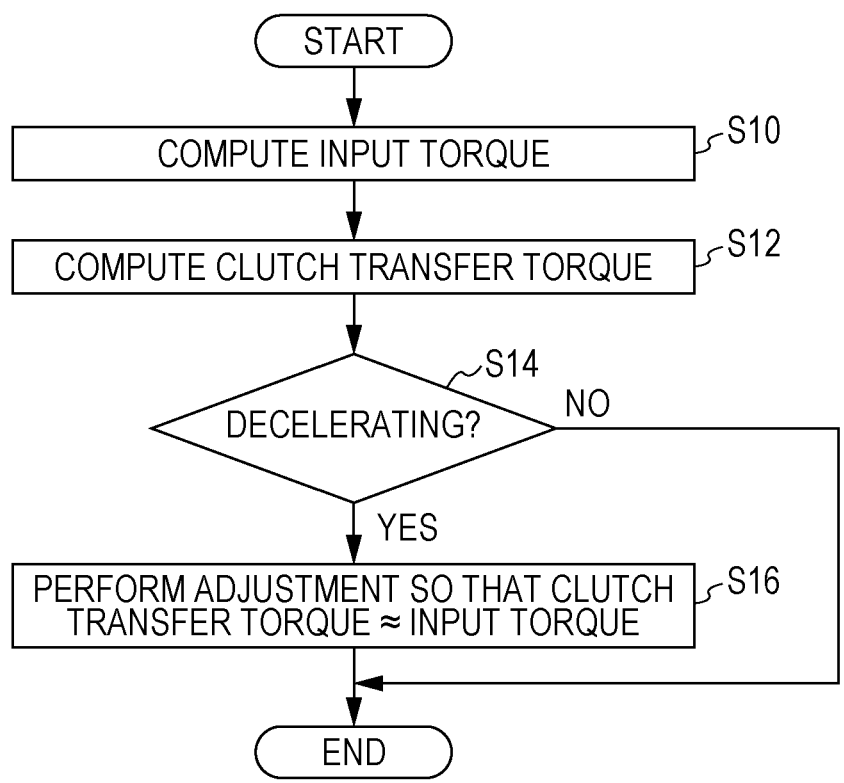
FIG. 4 is a flowchart of the operation performed by a clutch transfer torque control unit among operations performed by the apparatus illustrated in FIG. 3.

FIG. 4 is a detailed flowchart of the operation performed by the clutch transfer torque computing unit.

In step S10, an input torque is computed. The input torque is input to the drive pulley 26a of the CVT 26 via the main shaft MS. The input torque represents the sum of the output torque of the engine 10 and the inertia torque. The process in step S10 is performed by reading the value computed by the input torque computing unit 90b illustrated in FIG. 3.

The output torque of the engine 10 is obtained by multiplying the engine torque acquired by searching a map using the engine speed NE and the absolute pressure PBA in the intake pipe by an amplification factor of the torque converter 24.

The inertia torque is obtained as follows:

the inertia torque=$\{(Ie+Itbn+Idr)/(Ie+Itbn+Idr+Idn)\}\times$ maximum brake torque where Ie denotes the inertia torque of the engine 10, Itbn denotes the inertia torque of the turbine runner 24b of the torque converter 24, Idr denotes the inertia torque of the drive pulley 26a of the CVT 26, and Idn denotes the inertia torque of the driven pulley 26b of the CVT 26. The values of the above-described inertia torques and the maximum brake torque are fixed values obtained through an experiment in advance.

In step S12, the transfer torque of the clutch 28a is computed on the basis of the computed input torque. The transfer torque of the clutch is obtained by multiplying the computed input torque by an appropriate coefficient. The process in step S12 is performed by reading the value computed by the clutch transfer torque computing unit 90e illustrated in FIG. 3.

In step S14, it is determined whether the vehicle 14 is decelerating, that is, the vehicle 14 is under a drive condition in which the output torque of the engine 10 is being reduced. The process in step S14 is performed by reading the output of the speed reduction detecting unit 90a illustrated in FIG. 3.

More specifically, the speed reduction detecting unit 90a accesses the engine controller 66 and determines whether the engine 10 is in a fuel cut-off mode (i.e., whether supply of fuel is stopped). If the determination is "Yes", it is determined that the vehicle 14 is decelerating. When the accelerator pedal 56 is not depressed and if the engine speed NE is higher than or equal to a predetermined value, the engine controller 66 stops supplying fuel to the engine 10 (the engine controller 66 stops the engine 10 with fuel cut-off).

If, in step S14, the determination is "No", the subsequent steps are skipped. However, if, in step S14, the determination is "Yes", the processing proceeds to step S16, where the crutch transfer torque computed in step S12 is adjusted so as to be substantially the same as the input torque, that is, so as to be the same as or close to the input torque. This process is described in more detail below.

Figure 5:
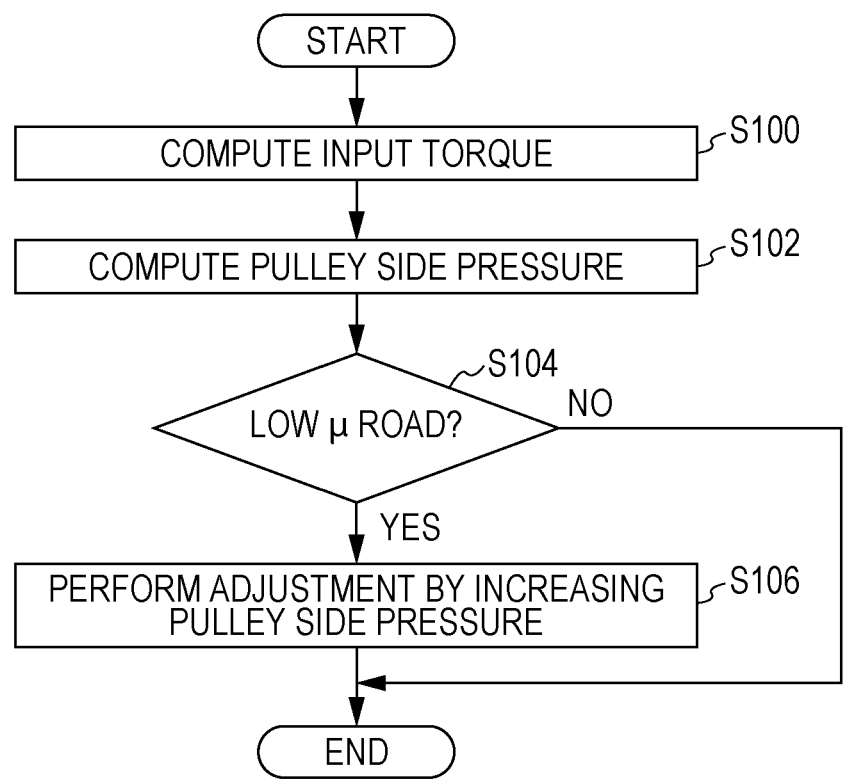
FIG. 5 is a flowchart of the operation performed by a pulley side pressure control unit among operations performed by the apparatus illustrated in FIG. 3.

FIG. 5 is a detailed flowchart of the operation performed by the above-described pulley side pressure control unit.

As in step S10 of the flowchart illustrated in FIG. 4, in step S100, the input torque is computed. In step S102, pulley side pressures (hydraulic pressure control values) supplied to the drive pulley 26a and the driven pulley 26b of the CVT 26 are computed.

That is, for one of the drive pulley 26a and the driven pulley 26b which has a lower pressure, a required side pressure generating such a force that the belt 26c does not slip is computed on the basis of the above-described input torque and an actual ratio.

For the other of the drive pulley 26a and the driven pulley 26b which has a higher pressure, a side pressure ratio is computed so that a target ratio is maintained. The target ratio is determined so that a target engine speed (more specifically, the rotational speed determined by the rotational speed NDR of the drive pulley 26a) searched for by using the vehicle velocity V (detected by the V sensor 76 and the accelerator position sensor 56a) and the accelerator position AP is realized.

Subsequently, the required side pressure is multiplied by the computed side pressure ratio. The resultant product is added by an F/B term computed so that a deviation between the actual ratio (the ratio of the detection value of the NDR sensor 72 to the detection value of the NDN sensor 74) and the target ratio decreases. The resultant sum is used as the pulley side pressure.

In step S104, it is determined whether the road on which the vehicle 14 is moving is a low μ road having a low road friction coefficient μ. This process is performed by reading the output of the low μ road detecting unit 90g.

The low μ road detecting unit 90g computes the sliding ratios of four wheels in the front—rear direction of the vehicle and the sliding ratios of four wheels in the right—left direction of the vehicle from the outputs of the wheel speed sensors 80. If any one of the outputs is outside a predetermined range, it is determined that the vehicle 14 is moving on a low μ road.

If, in step S104, the determination is "No", the subsequent steps are skipped. However, if, in step S104, the determination is "Yes", the processing proceeds to step S106, where the pulley side pressure is increasingly adjusted. More specifically, the pulley side pressure is increasingly adjusted by increasing the input torque by multiplying the input torque used for computing the required side pressure by an appropriate coefficient. This process is intended to prevent wheel lock-up.

Figure 6:
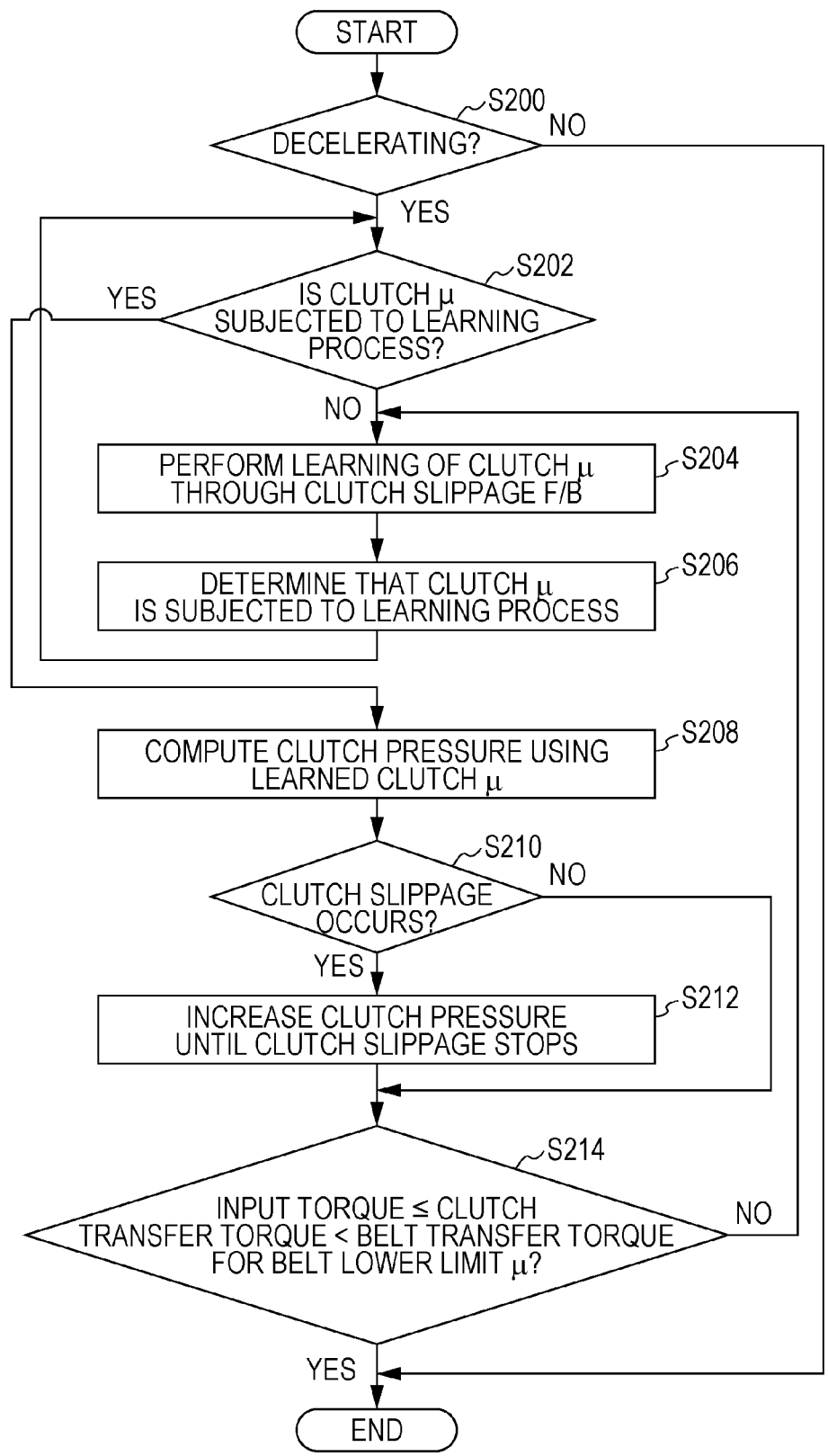
FIG. 6 is a flowchart of the operation performed by a clutch transfer torque control unit among operations performed by the apparatus illustrated in FIG. 3.

FIG. 6 is a detailed flowchart of the operation performed by the above-described clutch transfer torque control unit.

In step S200, it is determined whether the vehicle 14 is decelerating, that is, the vehicle 14 is under the drive condition in which the output torque of the engine 10 is being reduced. Like the process performed in step S14, this process is performed by reading the output of the speed reduction detecting unit 90a illustrated in FIG. 3.

If, in step S200, the determination is "No", the subsequent steps are skipped. However, if, in step S200, the determination is "Yes", the processing proceeds to step S202, where it is determined whether the crutch μ, that is, the friction coefficient μ (described in more detail below) of the clutch 28a has been subjected to a learning process.

If, in step S202, the determination is "No", the processing proceeds to step S204, where the clutch μ is learned through clutch slip F/B control. Thereafter, the processing proceeds to step S206, where it is determined that the clutch μ has been subjected to a learning process and, thereafter, the processing returns to step S202. However, if, in step S202, the determination is "Yes", the processing proceeds to step S208, where the clutch pressure is computed using the learned clutch μ (using the learned friction coefficient μ).

In step S210, it is determined whether a slippage of the clutch 28a occurs. If, in step S210, the determination is "Yes", the processing proceeds to step S212, where the clutch pressure is increased until the slippage of the clutch 28a stops. However, if, in step S210, the determination is "No", the process performed in step S212 is skipped.

According to the present exemplary embodiment, in the processing from step S202 through step S212, since a slippage of the belt 26c of the CVT 26 is avoided by allowing the clutch 28a to slip, it is desirable that the amount of slippage of the clutch 28a be set to a large value. However, if the amount of slippage of the clutch 28a is set to a large value, the hydraulic energy increases and, therefore, the load imposed on the pump increases. As a result, fuel consumption increases.

Accordingly, if it is determined that the vehicle 14 is decelerating, F/B control is performed so that the clutch 28a slightly slips. In this manner, the clutch pressure of the clutch 28a is accurately computed. Thereafter, the crutch transfer torque is computed on the basis of the computed clutch pressure. Thus, control is performed using the computed crutch transfer torque.

The clutch pressure of the clutch 28a is computed as follows:

the clutch pressure=the input torque/(the friction coefficient μ×the area of a clutch piston×the number of clutch plates×the effective diameter of the clutch)

where the input torque represents the value obtained in step S10 of the flowchart illustrated in FIG. 4, and the area of a clutch piston, the number of clutch surfaces, and the effective diameter of the clutch represent the area of the piston chamber 28a1 of the clutch 28a, the number of plates of the clutch 28a, and the effective diameter of the clutch 28a. Note that all of these values are known values (fixed values).

In the process performed in step S208, for example, a relatively low value of the friction coefficient μ for a low μ road is adopted as the initial value of the friction coefficient μ of the clutch 28a. The clutch pressure (the clutch control hydraulic pressure) is computed on the basis of this initial value using the above-described equation. In addition, if, in the processing from steps S202 through S206, a learned value of the friction coefficient μ can be obtained, the clutch pressure is computed on the basis of the latest learned value. Thus, the operation of the CR shift valve 46n illustrated in FIG. 2 is controlled, and a working pressure (a hydraulic pressure) is supplied to the clutch 28a.

In the learning control process performed in step S204, the friction coefficient μ is learned by computing the weighted average of the previous value and the current value of the friction coefficient μ so that the slippage ratio (detected from the NT sensor 70 and the NDR sensor 72) of the clutch 28a is, for example, 1%.

Note that in the learning control process performed from steps S202 through S206, the clutch 28a is already slipping and, therefore, a slippage of the belt 26c of the CVT 26 does not occur.

In step S214, the clutch pressure increased in step S212 is converted into the clutch transfer torque by computation using an appropriate a hydraulic pressure-torque conversion coefficient. In addition, the belt transfer torque for the belt lower limit μ is computed. Thereafter, it is determined whether the computed clutch transfer torque is higher or equal to the input torque (computed in step S10 of the flowchart illustrated in FIG. 4) and is lower than the computed belt transfer torque.

The belt lower limit μ represents a predetermined friction coefficient of the belt 26c of the CVT 26. More specifically, this value is obtained by measuring the friction coefficient when the belt 26c is used for a predetermined period of time and is stored in a map so as to be searchable using a parameter used for controlling the CVT 26 (more specifically, the above-described target engine speed and, more precisely, the rotational speed represented by the rotational speed NDR of the drive pulley 26a) and the actual ratio. The map is prestored in the ROM of the shift controller 90.

In addition, the belt transfer torque represents the torque transferred by the belt 26c of the CVT 26. More specifically, the belt transfer torque represents a value obtained by converting the pulley side pressure (the hydraulic pressure control value) computed in step S102 of the flowchart illustrated in FIG. 5 into a torque value using an appropriate hydraulic pressure—torque conversion coefficient.

Accordingly, in step S214, a required side pressure (a hydraulic pressure) is computed from the input torque computed in step S10 of the flowchart illustrated in FIG. 4 and the actual ratio. Thereafter, the computed required side pressure is converted into a torque value using the lower limit μ obtained by searching the map using the target engine speed and the actual ratio and an appropriate hydraulic pressure—torque conversion coefficient. In this manner, the belt transfer torque for the lower limit μ is computed.

If, in step S214, the determination is "No", the processing returns to step S204, where the above-described learning control is repeated until the determination made in step S214 is "No". In this manner, a clutch pressure that does not cause the clutch 28a to slip is computed (by addition).

By repeating the above-described processes in the flowchart illustrated in FIG. 6, the clutch transfer torque is controlled by the hydraulic pressure instruction value computing units 90h and 90i illustrated in the block diagram of FIG. 3 so as to be higher than or equal to the input torque and lower than the belt transfer torque for the belt lower limit μ.

Figure 7:
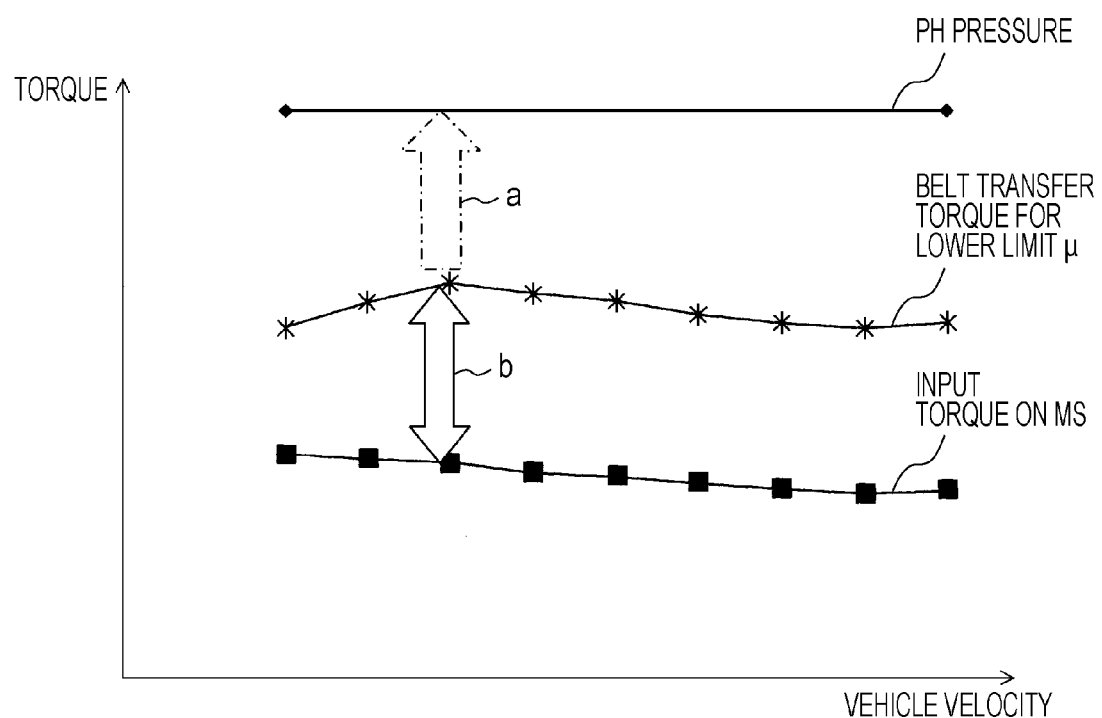
FIG. 7 is a diagram illustrating the vehicle velocity vs. a torque control characteristic of the power transmission apparatus.

This control is described next with reference to FIG. 7. FIG. 7 is a diagram illustrating the vehicle velocity vs. a torque control characteristic of the power transmission apparatus 48.

In FIG. 7, the ordinate represents a torque. The characteristic illustrated in the lowest section of FIG. 7 indicates the input torque on the main shaft MS (input to the drive pulley 26a and computed in step S10 of the flowchart illustrated in FIG. 4). The characteristic illustrated in the middle section of FIG. 7 indicates the belt transfer torque for the belt lower limit μ (computed in step S214 of the flowchart illustrated in FIG. 6). The characteristic illustrated in the highest section of FIG. 7 indicates the PH pressure (the output hydraulic pressure of the PH regulator valve 46c illustrated in FIG. 2).

When, as indicated by an arrow (an imaginary line) "a" in FIG. 7, the clutch transfer torque is controlled so as to be positioned above the belt transfer torque and if sudden braking (panic braking) is applied to the vehicle 14 during driving and, therefore, the vehicle 14 is rapidly decelerated, the number of rotations of the drive shaft 34 rapidly decreases, and the force of inertia exerted from the drive wheels 12 (the road surface) rapidly increases. Thus, an excessive load is imposed on the CVT.

In such a case, Japanese Examined Patent Application Publication No. 6-76824 describes that the line pressure is decreased to lower than a reference value to allow the belt 26c to slip. However, in order to ensure the belt life, it is undesirable that the belt 26c slip.

In that respect, the torque limiting technology that avoids slippage of the belt 26c by allowing the clutch 28a to slip is advantageous. However, in order to cover all levels of the load, it is required that the engagement pressure of the clutch 28a be sufficiently high. Accordingly, the hydraulic energy increases and, therefore, the pump load increases. As a result, fuel consumption increases.

Therefore, according to the present exemplary embodiment, as indicated by an arrow (a solid line) "b" illustrated in FIG. 7, if the vehicle 14 is decelerating, the belt transfer torque for the belt lower limit μ is computed. Thereafter, control is performed so that the clutch transfer torque is lower than the computed belt transfer torque. Thus, in the vehicle 14 having the CVT 26 mounted therein, even when an unforeseen force of inertia is input from the road surface side to the CVT 26, slippage of the belt 26c can be prevented.

That is, the pulley side pressure is computed from the input torque and the actual ratio. Accordingly, when the vehicle 14 is driving on a road other than a low μ road, the same value of the pulley side pressure is computed for a brand new belt 26c and a deteriorated metal belt 26c. However, by computing the belt transfer torque (used for determining the pulley side pressure) by searching for the belt lower limit μ in the above-described manner, the pulley side pressure in accordance with the deterioration level of the metal belt 26c (and the belt transfer torque computed from the pulley side pressure) can be obtained.

Furthermore, as illustrated in the flowchart of FIG. 4, when the vehicle 14 is not decelerating, control is performed so that the clutch transfer torque is obtained by multiplying the input torque by an appropriate coefficient, that is, the input torque< the clutch transfer torque. Accordingly, when the vehicle 14 is accelerating, a powerful acceleration feel can be achieved.

In contrast, when the vehicle 14 is decelerating, control is performed so that the input torque≤ the clutch transfer torque< the belt transfer torque for the belt lower limit μ. Thus, the clutch 28a can easily slip. That is, if, in the case of rapid deceleration, a brake torque is input from the drive wheels 12, the clutch 28a can easily slip by setting the clutch transfer torque to higher than or equal to the input torque received from the engine 10. In addition, since the pulley side pressure (the hydraulic pressure) corresponding to the clutch transfer torque can be low, an increase in the hydraulic energy (an increase in fuel consumption) can be prevented.

Furthermore, by allowing the belt lower limit μ to be searched for using the target engine speed and the actual ratio, the belt transfer torque can be computed in quick response to the actual operating conditions of the belt 26c.

As described above, according to the present exemplary embodiment, the power transmission apparatus 48 includes the CVT 26 and the clutch (the clutch 28a and the reverse braking clutch 28b and, in particular, the clutch 28a) disposed in series to the CVT 26, between a drive source and the drive wheels 12. The CVT 26 includes the drive pulley 26a connected to the engine (the drive source) 10 mounted in the vehicle 14, the driven pulley 26b connected to the drive wheels 12, and the belt 26c entrained between the drive pulley 26a and the driven pulley 26b. The power transmission apparatus 48 further includes a drive condition determination unit (e.g., the shift controller 90 and steps S14 and S200) that determines whether a vehicle is under a drive condition in which the output torque of the drive source is decreasing, an input torque computing unit (e.g., the shift controller 90 and step S10) that computes the input torque consisting of the output torque of the engine 10 (more precisely, the torque of the engine 10 input to the drive pulley 26a via the main shaft MS) and the inertia torque input to the drive pulley 26a, a belt transfer torque computing unit (e.g., the shift controller 90 and step S214) that computes the transfer torque of the belt 26c on the basis of at least the computed input torque and a predetermined friction coefficient (the belt lower limit μ) of the belt 26c, and a clutch transfer torque control unit (e.g., the shift controller 90, steps S202 to S214, and the hydraulic pressure instruction value computing units 90h and 90i) that computes the transfer torque of the clutch (the clutch transfer torque) on the basis of the computed input torque and performs control. If it is determined that the vehicle is under the drive condition, the clutch transfer torque control unit performs control so that the transfer torque of the clutch (the clutch transfer torque) is higher than or equal to the computed input torque and is lower than the computed transfer torque of the belt 26c (the belt transfer torque for the belt lower limit μ). Accordingly, even when an unforeseen force of inertia is input from the road surface side to the CVT 26 (e.g., in the case of rapid deceleration), the clutch 28a is allowed to slip first. As a result, slippage of the belt 26c can be prevented.

That is, control is performed so that the transfer torque of the clutch 28a is higher than or equal to the input torque and is lower than the transfer torque of the belt 26c. By performing control so that the transfer torque of the clutch 28a is lower than the transfer torque of the belt 26c, an unforeseen force of inertia exerted on the belt 26c can be absorbed by slippage of the clutch 28a. In this manner, slippage of the belt 26c can be prevented. In addition, by setting the transfer torque of the clutch 28a to higher than or equal to the input torque, a required acceleration feel can be achieved in the case of acceleration.

Furthermore, since the transfer torque of the clutch 28a is controlled so as to be lower than the transfer torque of the belt 26c, a high engagement pressure of the clutch 28a is not required. Accordingly, the hydraulic energy does not increase and, therefore, an increase in the fuel consumption due to an increase in the load imposed on the pump can be prevented.

Still furthermore, the clutch transfer torque control unit includes a clutch friction coefficient learning unit (e.g., the shift controller 90 and steps S202 to S212) that performs a clutch friction coefficient learning process in which the friction coefficient of the clutch is learned by causing the clutch 28a to slip. In addition, the clutch friction coefficient learning process is performed (step S214) so that the transfer torque of the clutch is higher than or equal to the computed input torque and is lower than the computed transfer torque of the belt 26c. Accordingly, since the learning is performed by causing the clutch 28a to slip, the clutch 28a is allowed to slip during learning. Therefore, in addition to the above-described advantage, the control accuracy of the transfer torque of the clutch 28a can be increased, and protection of the belt 26c can be provided at the same time.

Still furthermore, a predetermined friction coefficient μ of the belt 26c is set to a value that is searchable using a parameter used for controlling the CVT 26 from among the friction coefficients obtained while the belt is being used for a predetermined period of time. Accordingly, in addition to the above-described advantage, by setting a predetermined friction coefficient of the belt 26c to, for example, a value that can absorb a variation of the friction coefficient μ close to the lower limit indicating deterioration of the belt 26c, the value can reflect the control of the CVT 26. Accordingly, the transfer torque of the belt 26c can be optimally computed. In addition, by allowing the friction coefficient μ to be searchable using a parameter (e.g., the target engine speed and the actual ratio), the belt transfer torque can be computed in quick response to the actual operating conditions of the belt 26c.

Yet still furthermore, in addition to the above-described advantage, since the clutch 28a is disposed between the engine (the drive source) 10 and the CVT (the continuously variable transmission) 26, slippage of the belt 26c can be more reliably prevented. This is because when rapid deceleration that reduces the output torque of the engine 10 occurs and, therefore, the torque supplied from the driven pulley 26b connected to the drive wheels 12 via the drive shaft (the drive shaft) 34 and the input torque supplied from the engine 10 act on the belt 26c at the same time, the clutch 28a disposed between the engine 10 and the CVT 26 is allowed to slip. Thus, inputting of torque from the engine 10 to the belt 26c can be prevented.

Note that in the above description, it is determined whether the drive condition in which the output torque of the drive source (i.e., the engine) is decreasing by determining whether deceleration of the vehicle occurs, more specifically, whether the fuel cut-off is activated. However, the determination as to whether such a drive condition occurs is not limited thereto. For example, the occurrence of such a drive condition may be determined by detecting the operation performed on the brake pedal 40 using the brake switch 40a.

While the above exemplary embodiment has been described with reference to the CVT 26 of a belt type, the type of the CVT 26 is not limited thereto. For example, the CVT 26 may be of a toroidal type or a chain type.

According to the embodiment of the present application, a power transmission apparatus includes a continuously variable transmission including a drive pulley connected to a drive source mounted in a vehicle, a driven pulley connected to a drive wheel, and a belt entrained between the drive pulley and the driven pulley, a clutch disposed in series to the continuously variable transmission between the drive source and the drive wheel, a drive condition determination unit configured to determine whether the vehicle is under a drive condition in which an output torque of the drive source is decreasing, an input torque computing unit configured to compute an input torque consisting of the output torque of the drive source and an inertia torque input to the drive pulley, a belt transfer torque computing unit configured to compute a transfer torque of the belt on the basis of at least the computed input torque and a predetermined friction coefficient, and a clutch transfer torque control unit configured to compute the transfer torque of the clutch on the basis of the computed input torque and perform control. If it is determined that the vehicle is under the drive condition, the clutch transfer torque control unit performs control so that the transfer torque of the clutch is higher than or equal to the computed input torque and is lower than the computed transfer torque of the belt. Thus, even when an unforeseen force of inertia is input from the road surface side to the continuously variable transmission (e.g., in the case of sudden deceleration), the clutch can be allowed to slip first. As a result, the slippage of the belt can be prevented. That is, since control is performed so that the transfer torque of the clutch is higher than or equal to the computed input torque and is lower than the computed transfer torque of the belt, an unforeseen force of inertia exerted on the belt can be absorbed by the slippage of the clutch and, therefore, slippage of the belt can be prevented. In addition, by performing control so that the transfer torque of the clutch is higher than or equal to the computed input torque, a required acceleration feel can be achieved when the vehicle is accelerated. Furthermore, since control is performed so that the transfer torque of the clutch is lower than the transfer torque of the belt, a high engagement pressure of the clutch is not necessary. Accordingly, the hydraulic energy does not increase. As a result, an increase in fuel consumption due to an increase in the pump load can be prevented.

The clutch transfer torque control unit of the embodiment can include a clutch friction coefficient learning unit that performs a clutch friction coefficient learning process in which the friction coefficient of the clutch is learned by causing the clutch to slip. Accordingly, the clutch of the embodiment can be allowed to slip during the clutch friction coefficient learning process. As a result, in addition to the above-described advantages, the control accuracy of the transfer torque of the clutch can be increased, and protection of the belt can be provided at the same time.

The predetermined friction coefficient of the belt can be set to a value that is searchable from among friction coefficients obtained while the belt is being used for a predetermined period of time using a parameter used for controlling the continuously variable transmission. Accordingly, in addition to the above-described advantages, by setting the predetermined belt transfer torque to, for example, a value that can absorb a variation of the friction coefficient close to the lower limit indicating deterioration of the belt, the value can reflect the control of the continuously variable transmission. Thus, the transfer torque of the belt can be optimally computed.

The clutch of the embodiment can be disposed between the drive source and the continuously variable transmission. Accordingly, when, for example, rapid deceleration that reduces the output torque of the drive source occurs and, therefore, the torque supplied from the driven pulley connected to the drive wheel via the drive shaft and the input torque supplied from the drive source act on the belt at the same time, the clutch disposed between the drive source and the continuously variable transmission is allowed to slip. Thus, the input of torque from the drive source to the belt can be prevented. As a result, in addition to the above-described advantages, slippage of the belt can be more reliably prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A power transmission apparatus comprising:
a continuously variable transmission comprising:
    a drive pulley connected to a drive source mounted in a vehicle;
    a driven pulley connected to a drive wheel of the vehicle; and
    a belt entrained between the drive pulley and the driven pulley;
a clutch disposed in series to the continuously variable transmission between the drive source and the drive wheel;
a drive condition determination device configured to determine whether the vehicle is under a drive condition in which an output torque of the drive source is decreasing;
an input torque calculator configured to calculate an input torque comprising:
    the output torque of the drive source; and
    an inertia torque input to the drive pulley;
a belt transfer torque calculator configured to calculate a transfer torque of the belt based on at least
    the input torque calculated by the input torque calculator, and
    a predetermined friction coefficient of the belt; and
a clutch transfer torque controller configured to calculate a transfer torque of the clutch based on the input torque calculated by the input torque calculator, the clutch transfer torque controller controlling the transfer torque of the clutch so that the transfer torque of the clutch is higher than or equal to the input torque calculated by the input torque calculator and is lower than the transfer torque of the belt calculated by the belt transfer torque calculator if it is determined that the vehicle is under the drive condition,
wherein the predetermined friction coefficient of the belt is determined, using a parameter used for controlling the continuously variable transmission, from among friction coefficients comprising lower limits that are obtained while the belt is being used for a predetermined period of time.

2. The power transmission apparatus according to claim 1, wherein the clutch transfer torque controller includes a clutch friction coefficient learning device configured to perform a clutch friction coefficient learning process in which the friction coefficient of the clutch is learned by causing the clutch to slip.

3. The power transmission apparatus according to claim 1, wherein the clutch is disposed between the drive source and the continuously variable transmission.

4. The power transmission apparatus according to claim 1, wherein the clutch transfer torque controller adjusts the transfer torque of the clutch to be substantially equal to the input torque calculated by the input torque calculator if it is determined that the vehicle is under the drive condition.

5. The power transmission apparatus according to claim 1, further comprising:
a first rotational speed detector configured to detect a rotational speed of the drive pulley; and
a second rotational speed detector configured to detect a rotational speed of the driven pulley,
wherein the predetermined friction coefficient of the belt is determined from a map including a relationship among a friction coefficient of the belt, a target rotational speed of the drive source, and an actual ratio of the rotational speed of the drive pulley to the rotational speed of the driven pulley.

6. A power transmission apparatus comprising:
a continuously variable transmission comprising:
    a drive pulley connected to a drive source mounted in a vehicle;
    a driven pulley connected to a drive wheel of the vehicle; and
    a belt entrained between the drive pulley and the driven pulley;
a clutch disposed in series to the continuously variable transmission between the drive source and the drive wheel;
drive condition determination means for determining whether the vehicle is under a drive condition in which an output torque of the drive source is decreasing;
input torque calculation means for calculating an input torque comprising:
    the output torque of the drive source; and
    an inertia torque input to the drive pulley;
belt transfer torque calculation means for calculating a transfer torque of the belt based on at least the input torque calculated by the input torque calculation means, and a predetermined friction coefficient of the belt; and clutch transfer torque control means for calculating a transfer torque of the clutch based on the input torque calculated by the input torque calculation means, and for controlling the transfer torque of the clutch so that the transfer torque of the clutch is higher than or equal to the input torque calculated by the input torque calculation means and is lower than the transfer torque of the belt calculated by the belt transfer torque calculation means if it is determined that the vehicle is under the drive condition, wherein the predetermined friction coefficient of the belt is determined, using a parameter used for controlling the continuously variable transmission, from among friction coefficients comprising lower limits that are obtained while the belt is being used for a predetermined period of time.

7. A method for controlling a power transmission apparatus, the method comprising:

determining whether a vehicle is under a drive condition in which an output torque of a drive source is decreasing;

calculating an input torque comprising:

an output torque of the drive source; and an inertia torque input to a drive pulley of a continuously variable transmission;

calculating a transfer torque of a belt of the continuously variable transmission based on at least the input torque calculated in the calculating of the input torque, and a predetermined friction coefficient of the belt; and controlling a transfer torque of a clutch so that the transfer torque of the clutch is higher than or equal to the input torque calculated in the calculating of the input torque and is lower than the transfer torque of the belt calculated in the calculating of the transfer torque of the belt if it is determined that the vehicle is under the drive condition, the clutch being disposed in series to the continuously variable transmission, wherein the predetermined friction coefficient of the belt is determined, using a parameter used for controlling the continuously variable transmission, from among friction coefficients comprising lower limits that are obtained while the belt is being used for a predetermined period of time.

\* \* \* \* \*